Feb. 4, 1947. U. C. WALK 2,415,118
SIGNALING DEVICE
Filed Nov. 19, 1945
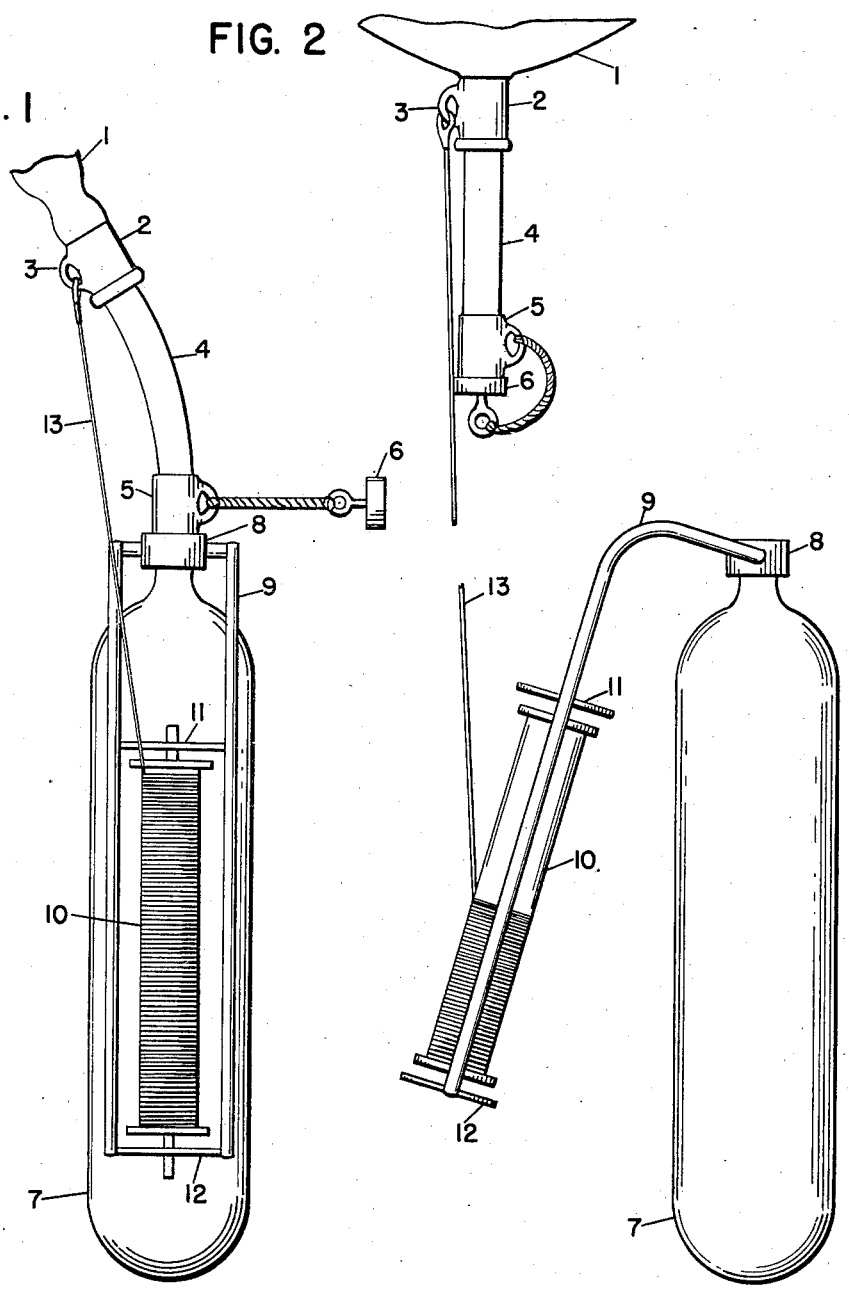
INVENTOR
UDELL C. WALK
BY
ATTORNEY Patented Feb. 4, 1947

2,415,118

UNITED STATES PATENT OFFICE 2,415,118

SIGNALING DEVICE

Udell C. Walk, United States Navy, Carmel, Calif.

Application November 19, 1945, Serial No. 629,692

2 Claims. (Cl. 244—98)

(Granted under the act of March 3, 1883, as amended April 30, 1928; 370 O. G. 757)

This invention relates to signaling devices and more particularly to visual signaling devices.

An object of the invention is to provide for the detection, from a relatively long distance, of the location of persons adrift at sea, forced down from aircraft, or otherwise stranded in isolated areas.

Other objects of the invention are to provide a signaling device having visible means adapted to be inflated with a gas lighter than air so as to be capable of ascending into the air when released to indicate the position of the person releasing the same; to provide a compact, reliable and easily portable unit comprising means for inflating the visible means and means for retaining the same captive when released into the air so that it can readily be lowered and moved and so that it can show continuously the true position of the operator, even though this may change.

In accomplishing these and other objects of the present invention, as will appear hereafter, I have provided improved details of structure, the preferred form of which is illustrated in the accompanying drawing, wherein:

Fig. 1 is a fragmentary side elevational view of a signaling device embodying the features of the present invention and showing a portion of the visible means during inflation; and Fig. 2 is a view of the device shown in Fig. 1 taken at right angles thereto and illustrating more particularly the visible means after inflation and the means for controlling the ascension of the visible means.

Referring more in detail to the drawing:

The numeral 1 designates a balloon of rubber, fabric, or similar material vividly colored so as to be readily visible when inflated. By means of a clamp 2, a connecting hose 4 and the balloon 1 are fastened together. The clamp 2 carries an eye 3 to which a cord 13 is attached. To the free end of the connecting hose 4 is attached a conventional check valve 5 to prevent undesired escape of gas from the balloon. To an eye on the check-valve there is attached a screw-threaded safety cap 6 which provides extra precaution against the undesired escape of gas from the balloon by covering the threaded open end of the check-valve 5, as shown in Fig. 2.

To inflate the balloon there is provided a cylindrical cartridge 7 filled with a compressed gas lighter-than-air such as hydrogen or helium. For controlling the flow of gas from the cartridge 7, a valve 8 is provided thereon operated by a handle 9, preferably of heavy wire. In plates 11 and 12 fixed to the wire handle is journalled a spool 10. On the spool is wound a suitable length of strong cord 13, one end of which is fastened to the spool and the other end of which is fastened to the balloon by means of eye 3.

Operation

The operation of the embodiment of the signaling device constructed as described is as follows:

When the operator desires to make known his location to searching parties, the balloon 1 is first inflated by attaching the check valve 5 on the balloon to the release valve 8 on the cartridge as shown in Fig. 1 and manipulating the control handle 9 to permit the buoyant gas to flow into the balloon. After the balloon 1 has been inflated, the gas is retained therein by the check valve 5 but as an added precaution the safety cap 6 is screwed over the check valve, Fig. 2. The balloon is then permitted to ascend under the action of the buoyant gas by allowing the cord 13 to unwind from the spool 10. The balloon, being vividly colored, is visible from a considerable distance and thus indicates the position of the operator. When it is desired to lower the balloon, such as after the completion of a rescue or when the operator moves through a thickly forested area, for example, the cord 13 can be rewound on the spool 10.

While I have shown but one embodiment of my invention, it is apparent that the device is susceptible of modification without departing from the spirit of the invention. I do not wish, therefore, to be limited by the disclosure set forth, but only by the scope of the appended claims.

The invention described herein may be manufactured and used by or for the Government of the United States of America for governmental purposes without the payment of any royalties thereon or therefor.

I claim:

1. A signaling device comprising an inflatable balloon, connecting means extending from said balloon and adapted to conduct gas into said balloon, said connecting means including check valve means to prevent escape of gas from the balloon, cord attaching means fixed to said balloon, a safety cap attached to said connecting means and adapted to cover the same, containing means for gas to inflate the balloon, valve means on said containing means to control the flow of gas therefrom, a handle to control said valve means, cord winding and retaining means mounted on said handle, and a cord attached at one end to said cord attaching means and at the other end to said cord winding means.

2. A signaling device comprising an inflatable balloon, a flexible hose, a clamp attaching one end of said flexible hose to said balloon, an eye on said clamp, a check valve fixed on the other end of said hose for preventing the escape of gas from said balloon, a safety cap connected to said check valve and adapted for threaded engagement therewith, a cartridge of gas for inflating said balloon, a valve on said cartridge for controlling the flow of gas therefrom, a handle for operating said valve, a spool on said handle, and a cord fixed at one end to said eye and at the other end to said spool.

UDELL C. WALK.

REFERENCES CITED

The following references are of record in the file of this patent:

UNITED STATES PATENTS

| Number | Name | Date |
| --- | --- | --- |
| 1,650,461 | Nilson | Nov. 22, 1927 |
| 2,395,006 | Leslie | Feb. 19, 1946 |